(12) United States Patent
Takagi et al.

(10) Patent No.: US 9,452,792 B2
(45) Date of Patent: Sep. 27, 2016

(54) VEHICLE COLLISION ENERGY ABSORBING MEMBER EXCELLENT IN ENERGY ABSORBING PERFORMANCE AND MANUFACTURING METHOD THEREFOR

(75) Inventors: Shusaku Takagi, Tokyo (JP); Kaneharu Okuda, Tokyo (JP); Yoshikiyo Tamai, Tokyo (JP); Takeshi Fujita, Tokyo (JP); Yoshitaka Okitsu, Saitama (JP); Tadashi Naito, Saitama (JP); Naoki Takaki, Saitama (JP); Tomoaki Sugiura, Saitama (JP)

(73) Assignees: JFE Steel Corporation (JP); Honda Motor Co., Ltd. (JP)

( * ) Notice: Subject to any disclaimer, the term of this patent is extended or adjusted under 35 U.S.C. 154(b) by 398 days.

(21) Appl. No.: 14/116,847

(22) PCT Filed: Apr. 23, 2012

(86) PCT No.: PCT/JP2012/002778
§ 371 (c)(1),
(2), (4) Date: Nov. 13, 2013

(87) PCT Pub. No.: WO2012/153471
PCT Pub. Date: Nov. 15, 2012

(65) Prior Publication Data
US 2014/0103684 A1    Apr. 17, 2014

(30) Foreign Application Priority Data
May 12, 2011  (JP) ................................ 2011-107214
Apr. 19, 2012  (JP) ................................ 2012-095957

(51) Int. Cl.
*C22C 38/04*    (2006.01)
*C22C 38/12*    (2006.01)
*C22C 38/06*    (2006.01)
(Continued)

(52) U.S. Cl.
CPC ............ *B62D 29/007* (2013.01); *B21D 53/88* (2013.01); *C21D 9/0068* (2013.01); *C22C 38/001* (2013.01); *C22C 38/02* (2013.01); *C22C 38/04* (2013.01); *C22C 38/06* (2013.01); *C22C 38/12* (2013.01); *C21D 9/46* (2013.01); *C21D 2211/001* (2013.01); *C21D 2211/005* (2013.01); *Y10T 29/49622* (2015.01)

(58) Field of Classification Search
None
See application file for complete search history.

(56) References Cited

U.S. PATENT DOCUMENTS

2009/0074605 A1    3/2009    Kim et al.

FOREIGN PATENT DOCUMENTS

CN    101432456    5/2009
EP    2 138 599    12/2009
(Continued)

OTHER PUBLICATIONS

Russian Official Action dated Feb. 25, 2015 along with its English translation from corresponding Russian Patent Application No. 2013155176.
(Continued)

*Primary Examiner* — Deborah Yee
(74) *Attorney, Agent, or Firm* — DLA Piper LLP (US)

(57) ABSTRACT

A vehicle collision energy absorbing member is excellent in collision energy absorbing performance in the axial direction upon collision. The vehicle collision energy absorbing member is formed of a high strength thin steel sheet having TS of at least 980 MPa and having an n-value and a limit bending radius Rc satisfying the following Formula: $Rc/t \leq 1.31 \times \ln(n) + 5.21$.

8 Claims, 4 Drawing Sheets

(51) Int. Cl.
    *C21D 7/00*     (2006.01)
    *B62D 29/00*     (2006.01)
    *C21D 9/00*     (2006.01)
    *C22C 38/00*     (2006.01)
    *C22C 38/02*     (2006.01)
    *B21D 53/88*     (2006.01)
    *C21D 9/46*     (2006.01)

(56) References Cited

FOREIGN PATENT DOCUMENTS

| | | |
|---|---|---|
| JP | 11-193439 | 7/1999 |
| JP | 2001-130444 | 5/2001 |
| JP | 2003-221623 | 8/2003 |
| JP | 2006-183140 | 7/2006 |
| JP | 2007-321207 | 12/2007 |
| JP | 2008-214645 | 9/2008 |
| JP | 2008-231541 | 10/2008 |
| JP | 2010-180462 | 8/2010 |
| JP | 2010-196115 | 9/2010 |
| JP | 2010-242173 | 10/2010 |
| JP | 2011-190474 | 9/2011 |

OTHER PUBLICATIONS

Okitsu, Yoshitaka, et al., "Mechanical Properties of Ultrafine Grained Multi-Phase Steel Sheets Aiming for Automobile Body Applicatons," Proceedings of the 2nd International Symposium on Steel Science (ISSS 2009), Oct. 21-24, 2009, Kyoto, Japan: The Iron and Steel Institute of Japan.

Japanese Office Action dispatched Aug. 4, 2015 of corresponding Japanese Application No. 2012-095957 along with its English translation.

Extended European Search Report dated Sep. 17, 2015 from corresponding European Patent Application No. 12781669.

Canadian Office Action dated Mar. 17, 2015 of corresponding Canadian Application No. 2,835,153.

Korean Office Action dated Mar. 11, 2015 of corresponding Korean Application No. 2013-7029601 with English translation.

Chinese Office Action dated Feb. 15, 2015 of corresponding Chinese Application No. 201280022779.6 with English translation.

Russian Official Action dated Feb. 9, 2015 along with its English translation from corresponding Russian Patent Application No. 2013155176.

FIG. 2
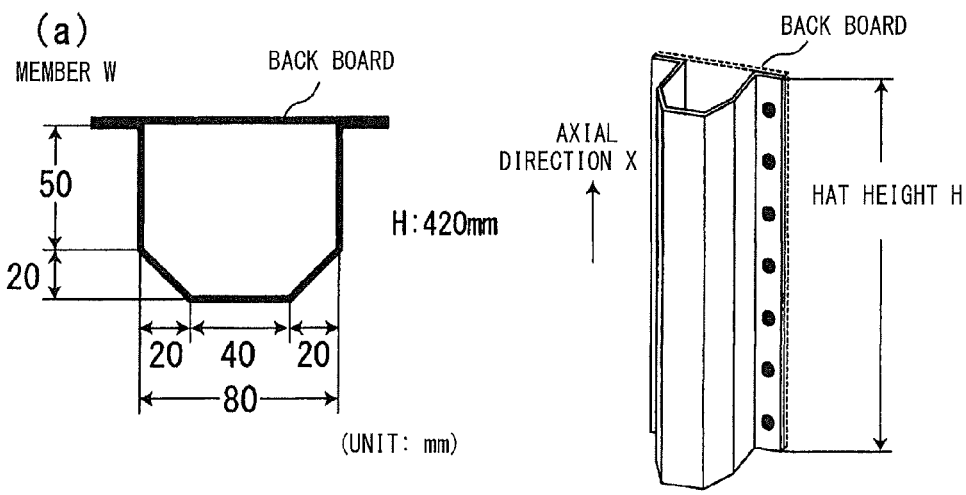
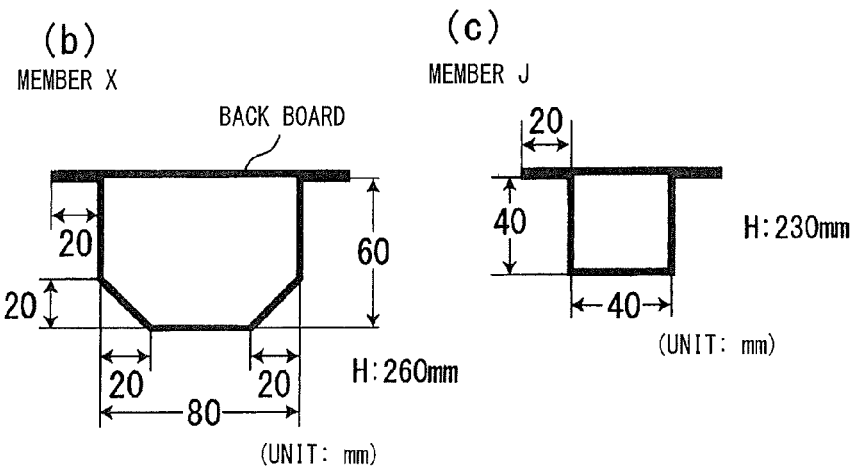

VEHICLE COLLISION ENERGY ABSORBING MEMBER EXCELLENT IN ENERGY ABSORBING PERFORMANCE AND MANUFACTURING METHOD THEREFOR

TECHNICAL FIELD

This disclosure relates to a collision energy absorbing member for a vehicle (also referred to as axial collapsing member for a vehicle) which axially crushes upon vehicle collision to thereby absorb the collision energy, and more particularly to stable improvement in collision energy absorbing performance.

BACKGROUND

In recent years, from the viewpoint of global environment protection, there has been a demand for weight reduction in vehicle bodies. High strength steel sheets are widely employed these days for vehicle bodies, in particular, for peripheral components to a passenger compartment (cabin), which contributes to reduction in weight of the vehicle body by thinning the walls thereof. On the other hand, the strength of high strength steel sheets used for an engine room and frames (including a front frame and a rear frame) of a trunk for the purpose of increasing strength merely reaches 780 MPa at maximum. The reason is that the high strength steel sheet for use as a material for a front frame and a rear frame cannot be increased excessively because it involves the following problems and does not necessarily lead to that much of an increase in impact energy absorption amount compared to the increase in strength. That is, the front frame or the rear frame, which serves as a collision energy absorbing member which undergoes significant deformation upon collision to absorb energy of the collision, may be deteriorated in ductility to suffer significant fracture, or has an unstable deformed shape upon collision failing to attain stable buckling, with the result that local fractures may easily occur, when the material steel is increased in strength.

Under the aforementioned circumstances, there is a demand for a collision energy absorbing member having a property of efficiently absorbing energy upon collision while increased in strength for the purpose of promoting the strength of the collision energy absorbing member forming a front frame or a rear frame and of attaining further weight reduction in a vehicle body.

To meet such demand, for example, JP 2001-130444 A discloses a collision energy absorbing member formed of a steel sheet having a microstructure including austenite in an area ratio of 60% or above. JP 2001-130444 A further discloses, as an example of the steel sheet having a microstructure including austenite in an area ratio of 60% or above, an austenite-based stainless steel sheet containing Cr by 18% to 19% and Ni by 8% to 12%, illustrating that a collision energy absorbing member formed by using the aforementioned steel sheet can be improved in deformation propagation properties upon collision to thereby ensure a desired collision energy absorbing performance.

JP H11-193439 A discloses a high strength steel sheet with good workability and having high dynamic deformation resistance. The high strength steel sheet illustrated in JP H11-193439 A has a multi-phase containing: ferrite and/or bainite, either one of which being used as a main phase; and a tertiary phase containing retained austenite by 3% to 50% in volume fraction, and has high dynamic deformation resistance in which, after a pre-deformation of more than 0% to 10% or less, a difference between a strength under quasi-static deformation $\sigma_s$ and a dynamic deformation strength $\sigma_d$ ($\sigma_d-\sigma_s$) satisfies at least 60 MPa, the strength under quasi-static deformation $\sigma_s$ being obtained when the steel sheet is deformed at a strain rate of $5\times10^{-4}$ to $5\times10^{-3}$ (1/s), the dynamic deformation strength $\sigma_d$ being obtained when the steel sheet is deformed at a strain rate of $5\times10^2$ to $5\times10^3$ (1/s), and the work-hardening exponent at a strain of 5% to 10% satisfies at least 0.130. According to JP H11-193439 A, a member manufactured by using a steel sheet having ($\sigma_d-\sigma_s$) of at least 60 MPa is capable of absorbing higher energy upon collision, as compared to a value estimated from the material steel sheet strength.

Further, JP 2007-321207 A discloses a high strength steel sheet having a multi-phase microstructure formed of a ferrite phase and a hard secondary phase contained in an area ratio of 30% to 70% with respect to the entire microstructure, the ferrite phase and the hard secondary phase being dispersed into the steel sheet, in which the area ratio of ferrite having a crystal grain diameter of 1.2 µM or less in the ferrite phase is 15% to 90%, and a relation between the average grain diameter ds of ferrite having a crystal grain diameter of 1.2 µm or less and an average grain diameter dL of ferrite having a crystal grain diameter exceeding 1.2 µm satisfies dL/ds≥3. The technology disclosed in JP 2007-321207 A is capable of improving the balance between strength and ductility that is important upon press forming, to thereby obtain a high strength steel sheet excellent in energy absorbability upon high speed deformation, so that the high strength steel sheet thus obtained can be applied to a vehicle body which requires high collision energy absorbing performance.

Further, according to JP 2008-214645 A and JP 2008-231541 A, studies were made, using a recess introduced rectangular tubular member, on steel sheets capable of being deformed upon axial collapse deformation without crumbling and cracking, and it was found that the amount and size of ferrite, bainite, austenite, and precipitates may be controlled so as to allow the steel sheet to deform without causing crumbling and cracking in the deformation mode upon collision.

Further, Y. Okitsu and N. Tsuji; Proceedings of the 2nd International Symposium on Steel Science (ISSS 2009), pp. 253-256, Oct. 21-24, 2009, Kyoto, Japan: The Iron and Steel Institute of Japan shows examples of a hat profile parts that stably crushes into a bellows shape upon collision crushing. The member is formed of a thin steel sheet having a tensile strength of 1155 MPa and an ultrafine grain multi-phase microstructure, in which n-value is 0.205 for a true strain in a range of 5% to 10%. The thin steel sheet described in Y. Okitsu and N. Tsuji; Proceedings of the 2nd International Symposium on Steel Science (ISSS 2009), pp. 253-256, Oct. 21-24, 2009, Kyoto, Japan: The Iron and Steel Institute of Japan has a chemical composition based on: 0.15% C-1.4% Si-4.0% Mn-0.05% Nb, and has a microstructure including ferrite and a secondary phase each being in submicron size, the secondary phase containing retained austenite by 12% to 35%, that is high in n-value and in strain hardenability.

According to JP 2001-130444 A, the collision energy absorbing member is formed of a steel sheet containing a large amount of austenite. Austenite has a face centered cubic (fcc) crystal structure, and thus has a feature in that it is less susceptible to embrittlement and fracture, which can increase to a certain degree the amount of energy to be absorbed upon collision. However, the steel sheet containing a large amount of austenite as disclosed in JP 2001-130444 A has a low tensile strength of about 780 MPa, and further the strength thereof is lower as compared to a steel sheet having a body centered cubic (bcc) structure when deformed at a high strain rate such as upon collision, which lacks sufficient strength for use as a material for a vehicle collision energy absorbing member. In addition, the Ni content and the Cr content need to be increased to obtain a steel sheet containing a large amount of austenite, which leads to an increase in manufacturing cost. From this point of view, the steel sheet of JP 2001-130444 A is unsuitable for use in a vehicle body member.

According to the technology of JP H11-193439 A, the hat-type member was only evaluated for a steel sheet having a tensile strength of about 780 MPa at maximum. A member formed of a steel sheet having a tensile strength of less than 980 MPa is easily deformed into a bellows shape upon collision deformation without suffering fracture and breakage, and thus the energy to be absorbed by the member upon collision deformation can be estimated based on the material properties. In contrast, a member formed of a steel sheet having a tensile strength of 980 MPa or above suffers fracture and breakage upon collision deformation, and thus the energy to be absorbed by the member upon collision often shows a value lower than expected from the material properties. The technology of JP H11-193439 A has difficulty in suppressing fracture and breakage upon high-speed crush of the member formed of a high strength steel sheet having a tensile strength of 980 MPa or above to thereby stably improve the energy to be absorbed upon high speed crush.

According to the technology described in JP 2007-321207 A, the steel sheet has a mixed microstructure of nanocrystal grains and microcrystal grains, in which the type and the microstructure fraction of the hard secondary phase are optimized, to thereby obtain a high strength steel sheet that is high in strength while having high ductility. However, JP 2007-321207 A gives no description about forming a collision energy absorbing member using the steel sheet, and makes no reference to suppressing fracture and breakage, which otherwise become problematic when a member is formed of a steel sheet having a tensile strength of 980 MPa or above, in the member upon collision to allow the member to be axially stably buckled into a bellows shape to efficiently absorb collision energy, which thus remains unclear.

Further, according to the technology described in JP 2008-214645 A and JP 2008-231541 A, C, Si, Mn, and Ti and/or Nb are each contained by an appropriate amount to properly control the amount of ferrite, bainite, and retained austenite in the steel sheet microstructure, the grain sizes thereof, C concentration in the retained austenite, and the size and the number of precipitates, to thereby attain axial collapse deformation without suffering the crumbling and cracking described above. However, those disclosures may have difficulty in stably attaining axial collapse deformation without suffering crumbling and cracking, particularly in a steel sheet having a tensile strength of 980 MPa or above, and stable energy absorption to be attained through axial collapse deformation is limitedly ensured only when the steel sheet has a combination of the aforementioned chemical composition and microstructure, and thus there has been a demand for a member formed of a steel sheet with TS 980 MPa or above that is capable of suppressing fracture and breaking upon high-speed crush, so as to be stably buckled into a bellows shape.

According to Y. Okitsu and N. Tsuji; Proceedings of the 2nd International Symposium on Steel Science (ISSS 2009), pp. 253-256, Oct. 21-24, 2009, Kyoto, Japan: The Iron and Steel Institute of Japan, the member is formed of a steel sheet improved in n-value serving as a measure of the strain hardenability, so as to be formed as a collision energy absorbing member which crushes into a bellows shape in the axial direction upon collision. However, we found that even when a steel sheet having an n-value higher than 0.205 is used to fabricate the collision (impact) energy absorbing member and the member is impact deformed in the axial direction, the member may still fail to be stably buckled (crushed) into a bellows shape in some cases.

Therefore, there is a need to provide a vehicle collision energy absorbing member formed of a high strength thin steel sheet having a tensile strength TS of 980 MPa or above, which is also excellent in axial collision energy absorbing performance upon collision; and a manufacturing method therefor. When a member is "excellent in axial collision energy absorbing performance upon collision", it means that the member is stably buckled in the axial direction and crush-deformed into a bellows shape upon vehicle collision, to thereby efficiently absorb energy of the collision, which may also be referred to as being "excellent in axial collapse stability".

SUMMARY

We provide:

(1) A vehicle collision energy absorbing member formed by shaping a high strength thin steel sheet, in which the high strength thin steel sheet has a tensile strength TS of at least 980 MPa, and has an n-value and a limit bending radius Rc satisfying Formula (1) below:

$$Rc/t \leq 1.31 \times \ln(n) + 5.21 \quad (1);$$

where
Rc: limit bending radius (mm),
t: sheet thickness (mm), and
n: n-value obtained for a true strain in a range of 5% to 10%.

(2) A vehicle collision energy absorbing member formed by shaping a high strength thin steel sheet, in which the high strength thin steel sheet has a tensile strength TS of at least 980 MPa, and has an n-value and a limit bending radius Rc satisfying Formula (2) below:

$$Rc/t \leq 1.31 \times \ln(n) + 4.21 \quad (2);$$

where
Rc: limit bending radius (mm),
t: sheet thickness (mm), and
n: n-value obtained for a true strain in a range of 5% to 10%.

(3) The vehicle collision energy absorbing member according to item (1) or (2), in which the high strength thin steel sheet includes a chemical composition containing, by mass %:
C: 0.14% to 0.30%;
Si: 0.01% to 1.6%;
Mn: 3.5% to 10%;
P: 0.060% or less;
S: 0.0050% or less;
Al: 0.01% to 1.5%;
N: 0.0060% or less;
Nb: 0.01% to 0.10%; and
the balance being Fe and incidental impurities, in which the high strength steel sheet has a microstructure including a ferrite phase by 30% to 70% in volume fraction with respect to the entire microstructure and a secondary phase other than the ferrite phase, the ferrite phase having an average grain size of 1.0 μm or smaller, the secondary phase at least containing a retained austenite phase by at least 10% in volume fraction to the entire microstructure, the retained austenite phase having an average spacing of 1.5 μm or less.

(4) The vehicle collision energy absorbing member according to item (3), in which the chemical composition contains Si and Al such that the total content of Si and Al (Si+Al) by mass % satisfies at least 0.5%.

(5) A method of manufacturing a vehicle collision energy absorbing member by using, as a material, a high strength thin steel sheet, which is formed into a predetermined shape so as to provide a vehicle collision energy absorbing member in the predetermined shape, in which the material selectively employs a high strength thin steel sheet having a tensile strength TS of at least 980 MPa and having an n-value and a limit bending radius Rc satisfying Formula (1) below;

$$Rc/t \leq 1.31 \times \ln(n) + 5.21 \quad (1);$$

where

Rc: limit bending radius (mm), t: sheet thickness (mm), and n: n-value obtained for a true strain in a range of 5% to 10%.

(6) A method of manufacturing a vehicle collision energy absorbing member by using, as a material, a high strength thin steel sheet, which is formed into a predetermined shape so as to provide a vehicle collision energy absorbing member in the predetermined shape, in which the material selectively employs a high strength thin steel sheet having a tensile strength TS of at least 980 MPa and having an n-value and a limit bending radius Rc satisfying Formula (2) below;

$$Rc/t \leq 1.31 \times \ln(n) + 4.21 \quad (2);$$

where

Rc: limit bending radius (mm), t: sheet thickness (mm), and n: n-value obtained for a true strain in a range of 5% to 10%.

(7) The method of manufacturing a vehicle collision energy absorbing member according to item (5) or (6), in which the high strength thin steel sheet includes a chemical composition containing, by mass %:

C: 0.14% to 0.30%;
Si: 0.01% to 1.6%;
Mn: 3.5% to 10%;
P: 0.060% or less;
S: 0.0050% or less;
Al: 0.01% to 1.5%;
N: 0.0060% or less;
Nb: 0.01% to 0.10%; and
the balance being Fe and incidental impurities, in which the high strength steel sheet has a microstructure including a ferrite phase by 30% to 70% in volume fraction with respect to the entire microstructure and a secondary phase other than the ferrite phase, the ferrite phase having an average grain size of 1.0 μm or smaller, the secondary phase at least containing a retained austenite phase by at least 10% in volume fraction to the entire microstructure, the retained austenite phase having an average spacing of 1.5 μm or less.

(8) The method of manufacturing a vehicle collision energy absorbing member according to item (7), in which the chemical composition contains Si and Al such that the total content of Si and Al (Si+Al) by mass % satisfies at least 0.5%.

We thus provide for the easy and stable manufacture of a vehicle collision energy absorbing member, the member being formed by shaping a high strength thin steel sheet having a tensile strength TS of at least 980 MPa while being excellent in axial collision energy absorbing performance, to thereby provide remarkable industrial effects. Further, a high strength thin steel sheet of 980 MPa or above can be used as a material, which attains strengthening of a collision energy absorbing member such as a front frame and a rear frame, leading to a weight reduction of the vehicle body.

BRIEF DESCRIPTION OF THE DRAWINGS

FIGS. 2(a)-2(c) are explanatory diagrams schematically illustrating shapes of the vehicle collision energy absorbing member used in the Examples.

DETAILED DESCRIPTION

We fabricated a member formed of a high strength thin steel sheet member and hat-shaped in cross section, and subjected the member to axial collision deformation to determine the deformation behavior of the member. We discovered that the bending property, in particular, the 180° U-bending property of the high strength steel sheet is an essential factor, in addition to the n-value of the high strength steel sheet used as the material to have the member stably buckled in the axial direction to be crush-deformed into a bellows shape. We also found that a member that is low in 180° U-bending property cannot be axially crush-deformed into a bellows shape even if the n-value of the high strength steel sheet is high because the low 180° U-bending property allows tearing and a non-uniform deformation to occur in a deformed portion upon collision.

We further found that cracking to occur when the member is axially crushed mainly generates in the first buckling portion, and thus, the generation of cracking in the first buckling portion needs to be avoided because otherwise stable buckling fails to develop in the member and the member would not be crush-deformed into a bellows shape. Then, we discovered that the generation of cracking in the buckling portion of the member was avoidable as long as the curvature radius of the buckling portion is equal to or larger than the limit bending radius in the 180° U-bending of the material steel sheet. The term "limit bending radius" refers to a minimum curvature radius that does not cause cracking in the steel sheet surface. Hereinafter, the 180° U-bending is simply referred to as "bending". The curvature radius is substantially determined depending on the n-value as long as the thickness of the material steel sheet is the same, and a larger n-value leads to an increase in curvature radius in the buckling portion.

That is, even if the n-value is higher and thus the curvature radius in the buckling portion is larger, cracking still occurs in the buckling portion of the member when the limit curvature radius of the steel sheet is larger than the curvature radius of the buckling portion. On the other hand, even if the n-value is lower and thus the curvature radius in the buckling portion is smaller, the generation of cracking in the buckling portion of the member can be avoided when the steel sheet is excellent in bending property and has a limit bending radius equal to or smaller than the curvature radius in the buckling portion.

For the reasons mentioned above, it is important to make the limit curvature radius of the steel sheet equal to or smaller than the curvature radius in the buckling portion, thus striking a good balance between the n-value of the steel sheet and the limit bending radius is an important factor in order to stably buckle the member in the axial direction.

Figure 1:
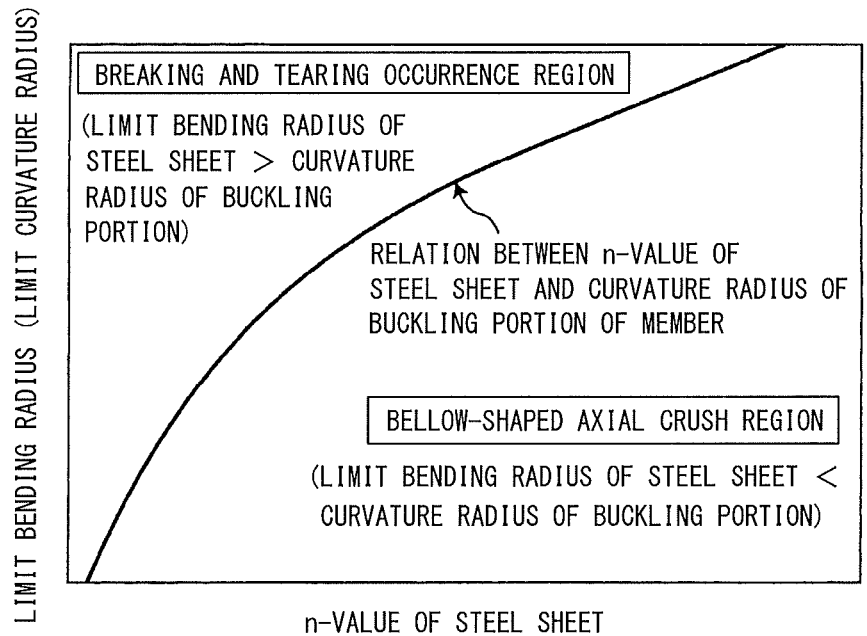
FIG. 1 is an explanatory chart schematically illustrating how the relation between a limit bending radius (Rc) and an n-value of a vehicle collision energy absorbing member influence the axial collapse deformation behavior of the vehicle collision energy absorbing member upon collision.

FIG. 1 is a chart schematically illustrating the basic idea. The curve of FIG. 1 illustrates a relation between the n-value of the material steel sheet and the curvature radius of the buckling portion, in which the curvature radius of the buckling portion is determined based on the n-value when the sheet thickness is the same. When the limit bending radius obtained for the material steel sheet is larger than the curve of FIG. 1 (breaking and tearing occurrence region), that is, when the limit bending radius is larger than the curvature radius of the buckling portion determined based on the n-value, the member suffers breaking and tearing when collision-deformed, without being axially crush-deformed into a bellows shape.

Meanwhile, when the limit bending radius obtained for the material steel sheet is equal to or smaller than the curve of FIG. 1 (bellow-shaped axial crush region), that is, when the limit bending radius is equal to or smaller than the curvature radius of the buckling portion determined based on the n-value, the member is deformed to have a predetermined curvature radius when collision-deformed so that the member is stably buckled in the axial direction so as to be crush-deformed into a bellows shape.

In other words, even if the n-value of the material steel sheet is the same, a member formed of a steel sheet deteriorated in bending property due to an increase in limit bending radius suffers breaking and tearing and fails to be stably buckled into a bellows shape. When the n-value of a steel sheet is increased, also increased is the curvature radius of the buckling portion, which is determined based on the n-value, with the result that the member is stably buckled into a bellows shape even if the bending property is slightly deteriorated and the limit bending radius is increased.

It is thus essential to form the member with a steel sheet in which the relation between the n-value and the bending property satisfies a predetermined relational formula in order to have the member stably buckled into a bellows shape when the member is collision-deformed in the axial direction.

The bending property is generally evaluated based either on 180° U-bending or on 90° V-bending, and in the present invention, the steel sheet was subjected to 180° U-bending test to evaluate the bending property thereof. Specifically, the 180° U-bending often has a larger limit bending radius than that of the 90° V-bending, the limit bending radius representing a bending cracking limit, and thus serves as an index associated with bending under a severer condition. Therefore, the 180° U-bending exhibits a good correlation with respect to the n-value as an index of the axial collapse deformation. On the other hand, the limit bending radius obtained for the 90° V-bending serves as an index for use in forming a member such as hat-shaped member which is bent-formed by about 90°, and thus 90° V-bending fails to show a proper relation between the n-value and the bending property in the axial collapse deformation. 180° U-bending is placed more importance than 90° V-bending, because the buckled/deformed portion that occurs when the member is crush-deformed into a bellows shape resembles a deformed state obtained through 180° U-bending.

First, description is given of experimental results.

In general, to evaluate the axial collapse performance of a collision energy absorbing member such as a side frame, a member having a square cross section is used. Thus, collision energy absorbing members (each having an axial height of 230 mm) each having a cross section of FIG. 2(c) were fabricated by using various high strength thin steel sheets with tensile strengths of 980 MPa class to 1180 MPa class, and a weight of 110 kgf was caused to crash into each of the members in the axial direction thereof at a rate that is equivalent to 50 km/h to crush-deform the member by 160 mm. Thereafter, members that were stably buckled into a bellows shape were selected, and subjected to observation of the deformation state after the crush.

The thin steel sheets used herein were subjected beforehand to investigation of their n-values, in addition to the tensile properties thereof. The n-values were each calculated for a true strain of 5% to 10%. If the uniform elongation in the tensile test fell below 10%, which means that a stress under the true strain of 10% cannot be calculated, the calculation was performed for a true strain in a range of 5% to a calculatable maximum true strain. The n-value was calculated using the following equation.

$$n\text{-value} = (\ln \sigma_{10} - \ln \sigma_5)/(\ln 0.1 - \ln 0.05)$$

(where $\sigma_{10}$: a true stress under a true strain of 10%, $\sigma_5$: a true stress under a true strain of 5%)

However, if data under a true strain of 10% cannot be collected, the calculation is performed for an obtainable maximum true strain and a true stress corresponding thereto.

Figure 3:
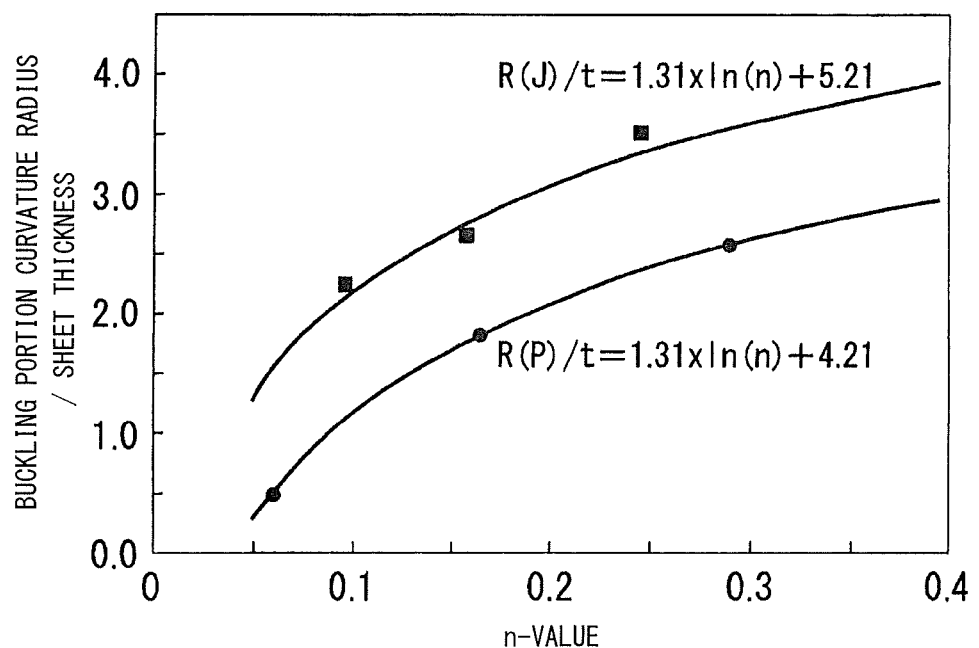
FIG. 3 is a graph showing the relation between the curvature radius at the time of buckling and the n-value of a member J having a square sectional shape and of a flat-sheet shaped member P.

The bending radius R(J) of a portion crushed into a bellows shape after the aforementioned collapse deformation, namely, a buckling portion, was measured, and FIG. 3 shows the obtained results in relation to the n-values. In FIG. 3, the results are normalized by the sheet thickness t, and shown as R(J)/t. The radius of the buckling portion was obtained in the following manner.

That is, the curvature radius of the buckling portion of the member was measured by using an R-gauge for curvature radius measurement, from which the sheet thickness was subtracted, to thereby obtain the bending radius of the buckling portion.

Referring to FIG. 3, the results obtained for the relation between the curvature radius R(J) of the buckling portion of the member J having a sectional shape of FIG. 2(c) and the n-value thereof can be simplified, as to the relation between R(J)/t and ln(n), to be in Equation (a) below:

$$R(J)/t = 1.31 \times \ln(n) + 5.21 \tag{a}$$

(where t: steel sheet thickness (mm)).

As described above, the bending radius of the buckling portion is substantially determined based on the n-value and, thus, a steel sheet having a value obtained by dividing the limit bending radius by the sheet thickness (the limit bending radius/the sheet thickness) that falls in a region below Equation (a), that is, in a region equal to or smaller than $1.31 \times \ln(n) + 5.21$ allows the member J to be stably buckled into a bellows shape. Meanwhile, a steel sheet having a value obtained by dividing the limit bending radius by the sheet thickness (the limit bending radius/the sheet thickness) that falls in a region above Equation (a), that is, in a region larger than $1.31 \times \ln(n) + 5.21$, makes it hard to attain stable buckling.

Figure 4:
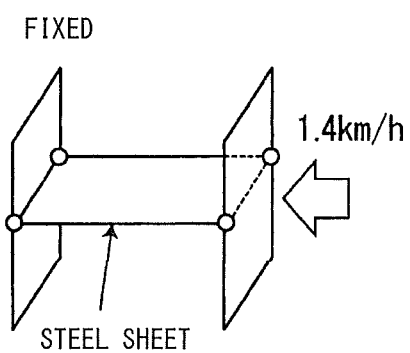
FIG. 4 is an explanatory diagram schematically illustrating a finite element analysis model used for simulating compression buckling of the flat-sheet shaped member.

Next, to eliminate the influence of the shape of the member, consideration is given to a case where a steel sheet for use was subjected to compressive buckling in a flat-sheet shape without being shaped. This can be considered, in evaluating the buckling, as a case of compression buckling caused under the severest condition. This buckling evaluation assumes severest conditions, and the attainable minimum curvature radius R(P) in the buckling portion was obtained by the finite element analysis using the model illustrated in FIG. 4. A dynamic explicit method solver was used in the finite element analysis. A sheet member (25 mm×40 mm×1.2 mm) was formed in a shell model, where one end thereof was fixed while the other end thereof was displaced so that the sheet member is bent deformed to be in a U-shape, and the minimum curvature radius on the inside of the sheet member was measured. The results thus obtained can be simplified, as to the relation between R(P)/t and ln(n), to be in Equation (b) below:

$$R(P)/t=1.31\times\ln(n)+4.21 \quad (b).$$

The relation rendered by Equation (b) is also shown in FIG. 3 along with the relation of Equation (a).

A steel sheet having a value obtained by dividing the limit bending radius by the sheet thickness (the limit bending radius/the sheet thickness) which falls in a region below Equation (b), that is, is equal to or smaller than 1.31×ln(n)+4.21 allows a member to be stably buckled into a bellows shape even if the member has a shallow cross-sectional shape closer to a flat-sheet shape which makes it hard to ensure stable buckling.

When R(J)/t and R(P)/t are compared to each other with the n-value being the same, R(P)/t is smaller than R(J)/t. The reason therefore is considered to be due to the influence exerted by constrains on the vertical wall of the cross section of the member, and it can be assumed that the limit curvature radius R(J) of the buckling portion is reduced to minimum in a flat sheet with no vertical wall.

The aforementioned results show that the member can be stably buckled into a bellows shape in the axial direction in a region satisfying Formula (1) below, where the limit bending radius Rc/t of the material steel sheet is equal to or below the curve rendered by Equation (a) of FIG. 3, that is, the limit bending radius Rc/t is equal to or smaller than R(J)/t of the buckling portion of the member with a square cross section, $$Rc/t \leq 1.31\times\ln(n)+5.21 \quad (1)$$

(where Rc: limit bending radius (mm), t: sheet thickness (mm), and n: n-value obtained between the true strain of 5% to 10%).

Further, in a region satisfying Formula (2) below, where the limit bending radius Rc/t is equal to or below the curve rendered by Equation (b) of FIG. 3, that is, the limit bending radius Rc/t is equal to or smaller than the curvature radius R(P)/t obtained for a buckled flat sheet, $$Rc/t \leq 1.31\times\ln(n)+4.21 \quad (2)$$

Figure 5:
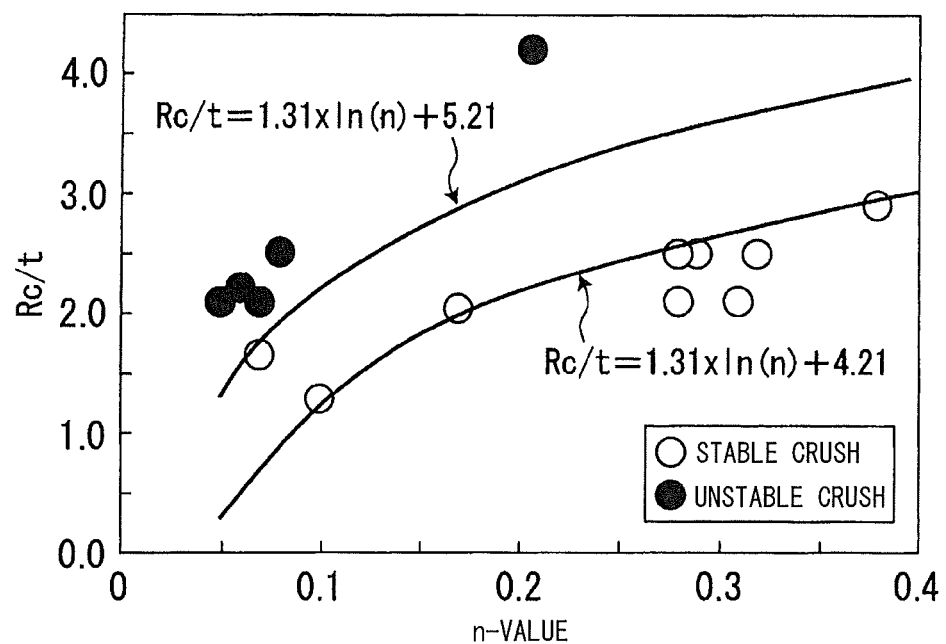
FIG. 5 is a graph showing a relation between the limit bending radius Rc/t and the n-value obtained in the Examples.

(where Rc: limit bending radius (mm), t: sheet thickness (mm), and n: n-value obtained between the true strain of 5% to 10%), the member can be stably buckled into a bellows shape in the axial direction even if the member has a shallow cross-sectional shape that is closer to a flat-sheet shape which makes it hard to ensure stable buckling. As to the relation of the limit bending radius and the n-value with respect to the crushed state of the member, as a result of studies made on members formed of various materials and into different shapes and simplification by Formulae (1) and (2) above, which are shown in FIG. 5 to be described later, we confirmed that a member formed of a steel sheet deteriorated in bending property because of the excessively increased limit bending radius Rc cannot be stably buckled into a bellows shape even if the n-value is substantially the same, whereas a larger n-value allows a member to be stably buckled even if the bending property has been deteriorated.

A configuration of a vehicle collision energy absorbing member is now described. The vehicle collision energy absorbing member is formed of a high strength thin steel sheet, the material steel sheet being formed into a predetermined shape. The term "predetermined shape" used herein, which is not necessarily particularly limited, may preferably refer to a cylindrical shape or a polygonal cross sectional shape that is capable of efficiently absorbing collision energy in the axial direction. Further, there is no need to particularly limit the method of forming the material steel sheet into a shape, and any generally-employed method including such as, for example, press forming and bend forming may be used.

Then, the high strength thin steel sheet to be used as a material for the member has a tensile strength TS of at least 980 MP, and also has an n-value and a limit bending radius Rc satisfying Formula (1) or (2) below:

$$Rc/t \leq 1.31\times\ln(n)+5.21 \quad (1)$$

(where Rc: limit bending radius (mm), t: sheet thickness (mm), and n: n-value obtained between the true strain of 5% to 10%), or $$Rc/t \leq 1.31\times\ln(n)+4.21 \quad (2)$$

(where Rc: limit bending radius (mm), t: sheet thickness (mm), and n: n-value obtained between the true strain of 5% to 10%). Here, the "thin steel sheet" herein refers to a steel sheet having a sheet thickness of 3.2 mm or less.

When the member is formed of a high strength thin steel sheet having an n-value and a limit bending radius Rc satisfying Formula (1) above, the member is allowed to be stably buckled in the axial direction upon vehicle collision so as to crush-deformed into a bellows shape, to thereby efficiently absorb collision energy, even if the material steel sheet is a high strength steel sheet having a tensile strength TS of 980 MPa or above. When the n-value and the limit bending radius Rc of the material steel sheet fail to satisfy Formula (1) above, a bending deformation portion suffers cracking (tearing) at the first buckling when crushing the member in the axial direction, which hinders the buckling to develop into a bellows shape thereafter. As a result, the stable buckling of the member cannot be ensured, failing to ensure the desired property for the member to efficiently and highly absorb collision energy.

That is, in crushing the member in the axial direction, even if the n-value of the material steel sheet is the same and thus the curvature radius of the bent portion of the member obtained at the time of buckling, which is determined based on the n-value, is also the same, the member is still capable of stably buckling to be crush-deformed into a bellows shape without suffering from cracking in the buckling portion upon being crushed in the axial direction, as long as the material steel sheet is a high strength steel sheet having a smaller limit bending radius Rc to satisfy Formula (1) or (2) above. Further, even a material steel sheet having an n-value that is not so large, for example, an n-value of 0.20 or less is still capable of stably buckling to be crush-deformed into a bellows shape without suffering from cracking in the buckling portion upon being crushed in the axial direction as long as the steel sheet has a limit bending radius that is sufficiently small to satisfy Formula (1) above.

Further, when the member is formed of a high strength steel sheet satisfying Formula (2) above, an excellent crushing property can be obtained even if the member has a shallow cross-sectional shape closer to a flat-sheet shape.

The n-value is obtained in the following manner. A test piece (JIS No. 5 test piece for tensile test: GL 50 mm) is collected from the high strength steel thin sheet, which is subjected to a tensile test in accordance with JIS Z 2241, and a value obtained by the following equation defined as a two-point method in JIS Z 2253 for a true strain in a range of 5% to 10% is used as the n-value herein:

$$n\text{-value}=(\ln \sigma_{10}-\ln \sigma_5)/(\ln 0.1-\ln 0.05)$$

(where $\sigma_{10}$: a true stress under a true strain of 10%, $\sigma_5$: a true stress under a true strain of 5%).

However, if data under a true strain of 10% cannot be collected, the calculation is performed for an obtainable maximum true strain and a true stress corresponding thereto.

Further, the limit bending radius Rc is obtained in the following manner. A test piece collected from the high strength thin steel sheet (sheet thickness: t mm) in accordance with JIS Z 2248 was subjected to a 180° U-bending test by bending the test piece along a die having a tip end curvature radius R changed at a pitch of 0.5 mm, so as to obtain a minimum bending radius that does not cause a linear cracking visually identifiable on the outside of the bending, and the minimum bending radius is defined as the limit bending radius Rc. The cracking herein does not refer to fine cracks resulting from inclusions. Generally, a crack of 1 mm or less in length is ascribable to inclusions.

The high strength thin steel sheet for use as a material of the member is not particularly limited in, for example, composition and microstructure thereof, as long as the steel sheet has an n-value and a limit bending radius Rc satisfying Formula (1) or (2) above.

To satisfy Formulae (1) and (2), the steel sheet is particularly preferred to be formed as a thin steel sheet including: a chemical composition containing, by mass %: C: 0.14% to 0.30%; Si: 0.01% to 1.6%, Mn: 3.5% to 10%, P: 0.060% or less, S: 0.0050% or less, Al: 0.01% to 1.5%, N: 0.0060% or less, Nb: 0.01% to 0.10%, and the balance being Fe and incidental impurities, and have a microstructure including: a ferrite phase by 30% to 70% in volume fraction to the entire microstructure; and a secondary phase other than the ferrite phase, the ferrite phase having an average grain size of 1.0 µm or smaller, the secondary phase at least containing a retained austenite phase by at least 10% in volume fraction to the entire microstructure, the retained austenite phase having an average spacing of 1.5 µm or less.

First, description is given of the reasons for restricting the content of each component of the high strength thin steel sheet preferred as a material for forming the member.

Hereinafter, mass % of each component is simply denoted by %.

C: 0.14% to 0.30%

Carbon (C) is an element that increases the volume fraction of a hard phase through improving quench hardenability to thereby increase steel strength while being concentrated in austenite to stabilize austenite to allow the austenite to be stabilized at room temperature. C content needs to be at least 0.14% to attain such an effect as described above. On the other hand, C content over 0.30% tends to incur significant deterioration in spot weldability and significant reduction in bending property. Therefore, the C content is 0.14% to 0.30%, preferably 0.23% or less.

Si: 0.01% to 1.6%

Silicon (Si) is an element that contributes to improving strength through solid solution strengthening and also improves ductility. Si content needs to be at least 0.01% to attain such an effect as described above. On the other hand, in a case where the Si content exceeds 1.6%, Si is concentrated as an oxide on the steel sheet surface, causing chemical conversion treatment failure and bare spot. The Si content is therefore 0.01% to 1.6%, preferably 0.1% to 1.0%.

Mn: 3.5% to 10%

Manganese (Mn) effectively contributes to improving strength and also has a function of stabilizing austenite to thereby improve elongation and the n-value. The Mn content needs be at least 3.5% to attain such an effect as described above. On the other hand, Mn content excessively exceeding 10% sees significant segregation, and the microstructure suffers from localized variation in transformation point due to segregation of Mn or the like. As a result, the steel sheet has a non-uniform microstructure in which a ferrite phase and a martensite phase exist in the form of bands, which deteriorates bending property. Further, in this case, Mn is concentrated as an oxide on the steel sheet surface, which may cause plating failure. The Mn content is 3.5% to 10%, preferably 4.0% to 7.0%.

P≤0.060%

Phosphorus (P) contributes to improving strength, whereas deteriorates weldability. Such an adverse effect becomes significant when the P content exceeds 0.060%. The P content is therefore defined to be 0.060% or less. An excessive reduction of the P content results in cost increase in the steelmaking process, and thus the P content is preferably at least 0.001%. Preferably, P content is 0.025% or less, and more preferably 0.015% or less.

S≤0.0050%

Sulfur (S) is an element that causes red brittleness, and may cause trouble in the manufacturing process when contained by a large amount. Further, S forms MnS as inclusions in the steel sheet, which remains as sheet-like inclusions after cold rolling, and thus deteriorates ultimate deformability of the material to thereby impair bending property. This adverse effect exerted by S becomes significant when the S content exceeds 0.0050%. The S content is therefore defined to be 0.0050% or less. Here, an excessive reduction of the S content results in increase in desulfurizing cost in the steelmaking process, and thus the S content is preferably at least 0.0001%, and more preferably 0.0030% or less.

Al: 0.01% to 1.5%

Aluminum (Al) is an element effective as a deoxidizer in the steelmaking process and also useful to separate nonmetal inclusions which would deteriorate bending property away into slag. Further, Al has a function of concentrating C in austenite so as to stabilize austenite, to thereby improve elongation and the n-value. The Al content needs to be at least 0.01% to attain such an effect as described above. On the other hand, the Al content exceeding 1.5% results in not only an increase in material cost but also significant deterioration in weldability. The Al content is therefore 0.01% to 1.5%, preferably 0.02% to 1.0%.

N≤0.0060%

Nitrogen (N) forms a solute to improve strength, whereas an excessive increase in content of N reduces ductility of the steel sheet. In view of purifying ferrite to improve ductility, the N content is preferred to be suppressed to minimum, whereas the desired effects remain unaffected as long as the N content is 0.0060% or less, and thus the N content is defined to be 0.0060% or less. However, an excessive reduction of the N content results in increase in steelmaking cost, and thus the N content is preferably at least 0.0001%.

Nb: 0.01% to 0.10%

Niobium (Nb) is an element that forms a bond to C or N, to thereby form a fine carbide or a fine nitride in a steel, and effectively contributes to: refinement of ferrite grains after cold rolling-annealing; and uniform fine dispersion and strength enhancement of austenite as a hard phase. In particular, proper control on the heating rate in the annealing process allows for refinement of ferrite and hard phase, which improves bending property, with the result that the steel sheet can be stably buckled so as to be crush-deformed into a bellows shape when the member is crushed in the axial direction. The Nb content needs to be at least 0.01% to attain such an effect as described above. On the other hand, the Nb content over 0.10% saturates the effect, and also leads to hardening of the hot rolled sheet, which causes an increase in hot-rolling load and cold-rolling load, reducing productivity. Further, an excessive content of Nb generates excessive precipitates in ferrite, which deteriorates the ductility of ferrite, impairing elongation and bending property. The Nb content is 0.01% to 0.10%, preferably 0.03% to 0.07%.

The basic components are illustrated as above, and the total content of Si+Al, each falling within the aforementioned range, is preferred to be at least 0.5%.

Si and Al each are an element that suppresses precipitation of cementite, while allowing for easy concentration of C in austenite. The total content of Si and Al is preferably at least 0.5% in order to more effectively retain austenite of 10% or more in the steel sheet. The total content is more preferably at least 0.7%.

The balance other than the aforementioned components includes Fe and incidental impurities.

The high strength thin steel sheet for use as a material of the member has the aforementioned chemical composition, and further has a microstructure (multi-phase) including, in volume fraction, a ferrite phase by 30% to 70% and a secondary phase other than the ferrite phase. The ferrite phase is formed of fine grains with an average grain size of 1.0 µm or less. With the ferrite phase being thus refined to have an average grain size of 1.0 µm or less, a desired high strength (TS: at least 980 MPa) can be ensured and bending property can even be improved. However, the aforementioned effect can no longer be expected when the average grain size of the ferrite phase exceeds 1.0 µm. Accordingly, the average grain size of the ferrite phase is defined to be 1.0 µm or less, and preferably 0.8 µm or less.

Meanwhile, the secondary phase other than the ferrite phase is a hard secondary phase at least containing a retained austenite phase by at least 10% in volume fraction with respect to the entire microstructure. The hard secondary phase thus contained leads to an improvement in strength and ductility. The retained austenite phase is contained at least 10% in volume fraction and finely dispersed so as to have an average spacing of 1.5 µm or less in the area of the retained austenite phase, which increases the n-value while ensuring excellent bending property, to thereby allow the relation between the n-value and the limit bending radius to be adjusted to fall within a desired range. Further, the steel sheet having a microstructure adjusted as described above allows the member to be deformed, when crushed, as being stably buckled into a bellows shape. The retained austenite phase contained by less than 10% or coarsely dispersed to have an average spacing above 1.5 µm fails to ensure, in particular, desired bending property. The retained austenite phase is preferably contained by at least 15% in volume fraction with an average spacing of 1 µm or less. The retained austenite phase preferably has an average grain size of 0.1 µm to 1 µm.

The hard secondary phase may include, other than the retained austenite phase, a bainite (including tempered bainite) phase, a martensite (including tempered martensite) phase, and a cementite phase. It is needless to say that each hard secondary phase other than the retained austenite phase is also preferred to be finely dispersed similarly to the retained austenite phase.

Next, a preferred method of manufacturing the high strength thin steel sheet for use as a material of the member is described.

The steel material having the aforementioned chemical composition may be preferably subjected to hot rolling process, pickling process, cold rolling process, and annealing process in this order, to thereby form a high strength thin steel sheet.

The method of manufacturing the steel material is not particularly limited, and any conventional steel melting method such as a converter may preferably be used to prepare molten steel having the aforementioned chemical composition, which may be subjected to a continuous casting method and an ingot casting and blooming method, to thereby obtain a thick slab (as the steel material).

The slab (steel material) thus obtained is preferably subjected to hot rolling process either after being once cooled and then re-heated or directly without going through a heat treatment after casting.

The heating temperature in the hot rolling process is preferably in a range of 1150° C. to 1400° C. The heating temperature falling below 1150° C. fails to attain the sufficient uniformization, whereas the high heating temperature above 1400° C. results in significant oxidation loss, deteriorating the yield. The heating temperature is preferably at least 1250° C. for the purpose of reducing the effect of Mn segregation so as to improve bending property.

In the hot rolling process, the slab is subjected to rough rolling and finish rolling to be obtained as a hot rolled sheet, which is wound up into a coil.

The conditions of rough rolling are not specifically limited as long as capable of forming a sheet bar in a desired dimensional shape. Further, in the finish rolling, the finishing delivery temperature is 850° C. to 950° C. The finishing delivery temperature falling out of the aforementioned range fails to uniformizing the hot rolled sheet microstructure, leading to deterioration in workability such as elongation and bending property.

After completion of the finish rolling, the steel sheet is subjected to cooling at an average cooling rate of 5° C./s to 200° C./s in a temperature range to 750° C. This way makes it possible to suppress the generation of band-like texture including two phases, namely, a ferrite phase and a pearlite phase. The coiling temperature is 350° C. to 650° C. The coiling temperature falling below 350° C. increases the steel sheet strength excessively, which makes it difficult to pass the sheet to the next step and also to perform cold rolling thereon. On the other hand, the coiling temperature exceeding 650° C. leads to excessive generation of an internal oxidation layer on the steel sheet surface, which significantly deteriorates fatigue resistance.

Next, the hot rolled sheet is subjected to cold rolling process in which the sheet is subjected to pickling and then to cold rolling to be obtained as a cold rolled sheet.

The cold rolling reduction rate in the cold rolling is preferably at least 30% for the purpose of refining the microstructure. When the hot rolled sheet is hard, it may be conceivable of having the sheet heated to about 500° C. and subjected to warm rolling instead of cold rolling. However, according to the present invention, strain accumulation in the cold rolling process is critical in refining the microstructure, and thus the steel sheet is subjected to rolling at room temperature, rather than to warm rolling at temperature which causes strain recovery.

Alternatively, the hot rolled sheet may be annealed to be softened. The cold rolling reduction rate is preferably suppressed to 60% or less because otherwise the rolling load is increased to make it difficult to perform cold rolling.

Then, the resultant cold rolled sheet is subjected to annealing process by subjecting the steel sheet to annealing to obtain a cold rolled annealed sheet.

In the annealing process, the steel sheet microstructure is controlled at the time of annealing and heating before being cooled control the volume fraction and the grain size of ferrite to be finally obtained. A primary heating of 300° C. to 600° C. is performed at a rapid average heating rate of 1° C./s to 50° C./s, and then a secondary heating from 600° C. to the annealing temperature is performed at an average heating rate of 0.1° C./s to 10° C./s, to thereby heat the steel sheet to the annealing temperature of 650° C. to 750° C.

The primary heating performed at a rapid heating rate of 1° C./s to 50° C./s on average allows for suppression of the grain growth of ferrite grains and fine dispersion of austenite phase in ferrite matrix, with the result that ferrite grains and the hard secondary phase can be finely dispersed in the microstructure. Further, the secondary heating performed at a heating rate of 0.1° C./s to 10° C./s allows for accurate control of annealing temperature.

The annealing temperature is from 650° C. to 750° C. An annealing temperature falling below 650° C. causes strains generated during the cold rolling to remain, which deteriorates bending property. On the other hand, a high annealing temperature above 750° C. leads to coarsened crystal grains, failing to obtain a desired fine microstructure.

The annealing temperature is preferred to be held at the aforementioned annealing temperature for 10 seconds to 500 seconds. The holding time of less than 10 seconds causes strains during the cold rolling to remain, which deteriorates bending property. Meanwhile, even if the annealing performed over a long period of time exceeding 500 seconds, hardly any structural change can be identified, and thus the upper limit of the holding time is preferably defined as 500 seconds.

After being held in the aforementioned annealing temperature, the steel sheet is cooled to a temperature range of 200° C. or below at an average cooling rate of 1° C./s to 30° C./s. The cooling rate of less than 1° C./s takes a long time in cooling, which incurs cost increase. On the other hand, a rapid cooling at a cooling rate of higher than 30° C./s results in non-uniform cooling in the steel sheet, which makes the material quality unstable. Alternatively, the steel sheet may be cooled from the annealing temperature to a temperature of 350° C. to 500° C. and then held at 350° C. to 500° C. for at least 10 seconds, preferably for at least 120 seconds, before being cooled to room temperature.

During cooling in the annealing process, the steel sheet may be subjected to galvannealing process in which the sheet is dipped into a hot dip galvanizing bath and then adjusted in zinc coating amount by means of, for example, gas wiping, and further heated to a predetermined temperature. Further, after the annealing process, the steel sheet may be subjected to, without any problem, electroplating of zinc or nickel and to skin pass rolling, which are generally employed for a steel sheet for a vehicle.

EXAMPLES

Example 1

Each molten steel having the chemical composition of Table 1 was prepared by steelmaking and casted into a slab (steel material) in a thickness of 300 mm. Then, the slabs thus obtained were each heated to the heating temperatures shown in Table 2 before being subjected to hot rolling including finish rolling under the conditions shown in Table 2, which were then cooled under the conditions shown in Table 2 and wound up into a coil at the coiling temperatures of Table 2 to be obtained as hot rolled sheets.

Then, the hot rolled sheets thus obtained were each subjected to cold rolling under the cold rolling reduction rates shown in Table 2 to be obtained as cold rolled steel sheets. Subsequently, the cold rolled steel sheets thus obtained were each subjected to annealing process under the conditions shown in Table 2.

The steel sheets (cold rolled annealed sheets) thus obtained were subjected to microstructure observation, tensile test, and bending test. Testing methods were as follows.

(1) Microstructure Observation

A test piece for microstructure observation was collected from each of the obtained steel sheets, which was subjected to polishing on a sectional surface in a sheet thickness direction parallel to the rolling direction and then etched with a 3% nital solution so that a microstructure in a region ranging from a steel surface to ¼ position in the sheet thickness direction was observed using a scanning electron microscope (of 1000 to 5000 magnifications), to thereby identify the microstructure and measure the crystal grain size of ferrite phase by an intercept method using the micrograph thus taken. In the intercept method, straight lines each in a length corresponding to 20 μm on the micrograph scale are drawn in a perpendicular direction and in a horizontal direction, respectively, to thereby calculate the average grain size of ferrite. To obtain the microstructure fraction of ferrite phase, the micrograph was processed using commercially available image processing software (Paint Shop Pro Ver. 9 (trade name) (released by Corel Corporation)) and binarized into the ferrite phase and the secondary phase so that the proportion of the ferrite phase was measured which was defined as the volume fraction of the ferrite phase.

Further, the microstructure fraction (volume fraction) of the retained austenite phase was measured through X-ray diffraction. The steel sheet was subjected to grinding up to a position of ¼ of the sheet thickness from a steel sheet surface, and then chemical polishing further 0.1 min. On this grinded and polished surface, by means of an X-ray diffractometer utilizing Kα line of Mo, integrated intensities were measured for (200), (220) and (311) faces of FCC iron and (200), (211) and (220) faces of BCC iron. From the above measurements, the microstructure fraction (volume fraction) of retained austenite was calculated. To obtain the distribution of residual austenite phase, the FCC phase was identified by electron backscattered pattern (EBSP) at the position of ¼ of the sheet thickness, and based on the data thus obtained, the average grain size and the average spacing were calculated for each FCC phase. The average grain size of retained austenite was calculated with a method of dissection in which straight lines each in a length corresponding to 20 μm on the map scale of EBSP were drawn in a perpendicular direction and in a horizontal direction on the EBSP map, and the sections were averaged. To obtain the average spacing of the retained austenite, 10 straight lines were drawn in random directions on the EBSP map, and the sections of ferrite grains between the retained austenite grains were measured, which were averaged to obtain the average spacing of the retained austenite.

(2) Tensile Test

A JIS No, 5 test piece having a longitudinal direction (tensile direction) in a direction at 90 degrees from the rolling direction collected in accordance with JIS Z 2201 from each steel sheet obtained was subjected to tensile test in accordance with JIS Z 2241, to thereby obtain tensile property (tensile strength TS). The n-value was calculated, based on the stress-strain data obtained in the tensile test, by the following equation defined as a two-point method in JIS Z 2253 for a true strain at 5% to 10%.

$$n\text{-value} = \ln \sigma_{10} - \ln \sigma_5/(\ln 0.1 - \ln 0.05)$$

(where $\sigma_{10}$: a true stress under a true strain of 10%, $\sigma_5$: a true stress under a true strain of 5%)

Here, if data under the true strain of 10% cannot be calculated, the calculation was performed using a calculatable maximum true strain and a true stress corresponding thereto.

(3) Bending Test

A bending test piece (30 mm width×100 mm length) collected in accordance with JIS Z 2248 from each of the steel sheets obtained was subjected to 180° U-bending test by bending the test piece along a die having a tip end curvature radius R changed at a pitch of 0.5 mm pitch, and the outside of the bent portion was visually observed as to whether there is any cracking generated, so as to obtain a minimum bending radius Rc (mm) that caused no cracking, and the minimum bending radius Rc was defined as the limit bending radius (mm). Cracking of 1 mm or less in length resulting from inclusion was exempted from the subjects of the observation.

The obtained results are shown in Table 3.

Next, a test material was collected from each of the high strength thin steel sheets having the aforementioned properties, and used to fabricate, through bend forming, a member having a sectional shape of FIG. 2, and the member thus formed is attached with a 590 MPa class high strength steel sheet serving as a back plate, to thereby obtain two types of crushing members each having a height of 420 mm (W) and of 260 mm (X), respectively. The ratio between the shortest side b among the sides parallel, or perpendicular to the back plate in a cross section of the member and the sheet thickness t is obtained as b/t=33.3 for the member X and as b/t=33.3 for the member W. A crushing test was carried out by using these crushing members configured as described above. Testing method was as follows.

(4) Crushing Test

The crushing members were each crushed in the axial direction with a varying weight of 110 kgf to 190 kgf depending on the member at a rate that is equivalent to 50 km per hour, so as to be crushed to a height of 200 mm or of 240 mm. After being crushed, it was visually identified how the members were deformed, while the amount of energy absorbed until a predetermined crush amount was calculated.

The obtained results are shown in Table 4.

TABLE 1

| Steel No. | Chemical Compositions (mass %) | | | | | | | |
|---|---|---|---|---|---|---|---|---|
| | C | Si | Mn | P | S | Al | N | Nb |
| A | 0.16 | 0.5 | 4.1 | 0.02 | 0.0013 | 0.025 | 0.0021 | 0.054 |
| B | 0.16 | 1.0 | 3.9 | 0.03 | 0.0024 | 0.022 | 0.0014 | 0.057 |
| C | 0.15 | 1.5 | 3.9 | 0.02 | 0.0011 | 0.019 | 0.0025 | 0.058 |
| D | 0.19 | 0.3 | 3.6 | 0.02 | 0.0030 | 0.024 | 0.0029 | 0.071 |
| E | 0.23 | 0.8 | 5.8 | 0.03 | 0.0012 | 0.017 | 0.0034 | 0.051 |
| F | 0.27 | 0.6 | 7.2 | 0.02 | 0.0029 | 0.033 | 0.0027 | 0.066 |
| G | 0.16 | 0.5 | 2.4 | 0.01 | 0.0018 | 0.031 | 0.0040 | — |
| H | 0.15 | 0.5 | 2.6 | 0.02 | 0.0010 | 0.032 | 0.0050 | — |
| I | 0.08 | 0.5 | 2.6 | 0.02 | 0.0010 | 0.032 | 0.0050 | — |

TABLE 2

| | | Hot Rolling Process | | | | Annealing Process | | | | |
|---|---|---|---|---|---|---|---|---|---|---|
| Steel Sheet No. | Steel No. | Heating Temp. (° C.) | Finishing Delivery Temp. (° C.) | Average Cooling Rate (° C./s)* after Finish Rolling | Coiling Temp. (° C.) | Cold Rolling Reduction Rate (%) | Heating Rate (° C./s) | | Annealing Temp. (° C.) | Holding Time (s) | Cooling Rate after Holding (° C./s)**** |
| | | | | | | | Primary Heating** | Secondary Heating** | | | |
| 1 | A | 1350 | 900 | 50 | 600 | 40 | 15 | 1.0 | 685 | 60 | 15 |
| 2 | B | 1300 | 920 | 30 | 550 | 40 | 15 | 0.5 | 710 | 120 | 10 |
| 3 | C | 1350 | 950 | 20 | 570 | 35 | 20 | 0.7 | 690 | 180 | 5 |
| 4 | D | 1270 | 880 | 70 | 620 | 40 | 30 | 0.5 | 670 | 90 | 30 |
| 5 | E | 1320 | 900 | 100 | 500 | 35 | 25 | 1.0 | 680 | 240 | 20 |
| 6 | F | 1250 | 930 | 40 | 600 | 35 | 15 | 1.5 | 660 | 200 | 30 |
| 7 | G | 1350 | 900 | 50 | 600 | 40 | 15 | 1.0 | 685 | 60 | 15 |
| 8 | H | 1350 | 900 | 50 | 600 | 40 | 15 | 1.0 | 750 | 60 | 15 |
| 9 | I | 1350 | 920 | 30 | 550 | 40 | 15 | 0.5 | 820 | 120 | 10 |

*Average rate between the finishing delivery temperature and 750° C.
**Average rate between 300° C. and 600° C.
***Average rate between 600° C. and annealing temperature
****Average rate between annealing temperature and 180° C.

TABLE 3

| Steel Sheet No. | Steel No. | Sheet Thickness (mm) | Type*** | Ferrite Volume Fraction (%) | Ferrite Average Crystal Grain Size (μm) | Austenite Volume Fraction (%) | Austenite Average Gain Size (μm) | Average Spacing (μm) |
|---|---|---|---|---|---|---|---|---|
| 1 | A | 1.2 | F + M + γ + B | 39 | 0.53 | 12 | 0.49 | 0.98 |
| 2 | B | 1.2 | F + M + γ + B | 43 | 0.72 | 18 | 0.67 | 0.82 |
| 3 | C | 1.2 | F + M + γ + B | 46 | 0.84 | 14 | 0.91 | 0.83 |
| 4 | D | 1.2 | F + M + γ | 55 | 0.54 | 22 | 0.58 | 0.74 |
| 5 | E | 1.2 | F + M + γ | 37 | 0.62 | 26 | 0.49 | 0.63 |
| 6 | F | 1.2 | F + M + γ | 32 | 0.78 | 28 | 0.62 | 0.71 |
| 7 | G | 1.2 | F + θ | 85 | 1.9 | — | — | — |
| 8 | H | 1.2 | F + M + γ + θ | 70 | 5.6 | 1 | immeasurable | immeasurable |
| 9 | I | 1.2 | F + M + γ + B | 66 | 8.3 | 2 | immeasurable | immeasurable |

| Steel Sheet No. | Tensile Properties TS (MPa) | n-value* | Limit Bending Radius Rc (mm) | Rc/t | Bending Properties R-value of Formula (1)** | Satisfiability of Formula (1) | R-value of Formula (2)** | Satisfiability of Formula (2) | Remarks |
|---|---|---|---|---|---|---|---|---|---|
| 1 | 1245 | 0.28 | 2.5 | 2.1 | 3.5 | satisfied | 2.5 | satisfied | Inventive Example |
| 2 | 1125 | 0.31 | 2.5 | 2.1 | 3.7 | satisfied | 2.7 | satisfied | Inventive Example |
| 3 | 1129 | 0.32 | 3.0 | 2.5 | 3.7 | satisfied | 2.7 | satisfied | Inventive Example |
| 4 | 1007 | 0.38 | 3.5 | 2.9 | 3.9 | satisfied | 2.9 | satisfied | Inventive Example |
| 5 | 1284 | 0.29 | 3.0 | 2.5 | 3.6 | satisfied | 2.6 | satisfied | Inventive Example |
| 6 | 1376 | 0.28 | 3.0 | 2.5 | 3.5 | satisfied | 2.5 | satisfied | Inventive Example |
| 7 | 1079 | 0.05 | 2.5 | 2.1 | 1.3 | unsatisfied | 0.3 | unsatisfied | Comparative Example |
| 8 | 1025 | 0.07 | 2.5 | 2.1 | 1.7 | unsatisfied | 0.7 | unsatisfied | Comparative Example |
| 9 | 983 | 0.08 | 3.0 | 2.5 | 1.9 | unsatisfied | 0.9 | unsatisfied | Comparative Example |

*Value obtained based on data for true strains of 5% and 10%. When the uniform elongation falls short of 10%, data obtained for a true strain of 5% and for a maximum true strain, and a true stress for each strain were used.
**Formula (1): $Rc/t \leq 1.31 \times \ln(n) + 5.21$ ... (1)  Formula (2): $Rc/t \leq 1.31 \times \ln(n) + 4.21$ ... (2)
***F: ferrite, M: Martensite, B: bainite, γ: austenite (retained γ), θ: cementite

TABLE 4

| Member No. | Steel Sheet No. | Member Shape* | Crush Stroke (mm) | Deformed State after Crush | Absorbed Energy (kJ) | Remarks |
|---|---|---|---|---|---|---|
| 1 | 1 | X | 200 | bellows shape | 15.5 | Inventive Example |
| 2 | 2 | W | 240 | bellows shape | 15.3 | Inventive Example |
| 3 | 3 | X | 200 | bellows shape | 12.1 | Inventive Example |
| 4 | 4 | X | 200 | bellows shape | 12.6 | Inventive Example |
| 5 | 5 | X | 200 | bellows shape | 13.2 | Inventive Example |
| 6 | 6 | X | 200 | bellows shape | 11.5 | Inventive Example |
| 7 | 7 | X | 200 | cracking | 10.3 | Comparative Example |
| 8 | 8 | X | 200 | cracking | 9.9 | Comparative Example |
| 9 | 9 | W | 240 | cracking | 11.3 | Comparative Example |

*See FIG. 2

All the Examples allowed the member to be stably buckled in the axial direction to be crush-deformed into a bellows shape when the steel sheet had a tensile strength TS of as high as 980 MPa or above and the n-value and the limit bending radius satisfy Formulae (1) and (2). Then, in that case, the energy absorbed upon crush reached as high as 11.5 kJ or above, which means that the member is excellent in collision energy absorbing performance. On the other hands, Comparative Examples falling out of our range saw generation of cracking and underwent non-uniform deformation when the member was crushed into the axial direction, and further the energy absorbed upon collision was less than 11.5 kJ, which means that the member is inferior in collision energy absorbing performance as compared the member that was stably buckled into a bellows shape.

Example 2

Collision energy absorbing members were fabricated using, as materials, thin steel sheets (each with a tensile strength of 980 MPa class to 1300 MPa class) having the tensile properties, the n-values, and the bending properties (limit bending radius Rc) shown in Table 5. The collision energy absorbing members were formed into one of those shapes of the members X, W, and J of FIG. 2. The back plates were each formed of a 590 MPa class high strength steel sheet, as in Example 1.

A crushing test was carried out by using these collision energy absorbing members configured as described above. The testing method was the same as those employed in Example 1.

The obtained results are shown in Table 5.

TABLE 5

| Member No. | Steel Sheet No. | Sheet Thickness t (mm) | Tensile Strength TS (MPa) | n-value* | Limit Bending Radius Rc (mm) | Rc/t | R-value of Formula (1)** | Satisfiability of Formula (1) | R-value of Formula (2)** | Satisfiability of Formula (2) |
|---|---|---|---|---|---|---|---|---|---|---|
| A1 | 1 | 1.2 | 1245 | 0.28 | 2.5 | 2.1 | 3.5 | satisfied | 2.5 | satisfied |
| A2 | 1 | 1.2 | 1245 | 0.28 | 2.5 | 2.1 | 3.5 | satisfied | 2.5 | satisfied |
| A3 | 1 | 1.2 | 1245 | 0.28 | 2.5 | 2.1 | 3.5 | satisfied | 2.5 | satisfied |
| B1 | 10 | 1.0 | 1125 | 0.31 | 2.5 | 2.5 | 3.7 | satisfied | 2.7 | satisfied |
| B2 | 10 | 1.0 | 1125 | 0.31 | 2.5 | 2.5 | 3.7 | satisfied | 2.7 | satisfied |
| B3 | 10 | 1.0 | 1125 | 0.31 | 2.5 | 2.5 | 3.7 | satisfied | 2.7 | satisfied |
| C1 | 11 | 1.2 | 1007 | 0.1 | 1.5 | 1.3 | 2.2 | satisfied | 1.2 | unsatisfied |
| C2 | 11 | 1.2 | 1007 | 0.1 | 1.5 | 1.3 | 2.2 | satisfied | 1.2 | unsatisfied |
| C3 | 11 | 1.2 | 1007 | 0.1 | 1.5 | 1.3 | 2.2 | satisfied | 1.2 | unsatisfied |
| D1 | 12 | 1.2 | 1215 | 0.07 | 2.0 | 1.7 | 1.7 | satisfied | 0.7 | unsatisfied |
| D2 | 12 | 1.2 | 1215 | 0.07 | 2.0 | 1.7 | 1.7 | satisfied | 0.7 | unsatisfied |
| D3 | 12 | 1.2 | 1215 | 0.07 | 2.0 | 1.7 | 1.7 | satisfied | 0.7 | unsatisfied |
| E1 | 13 | 1.0 | 1021 | 0.17 | 2.0 | 2.0 | 2.9 | satisfied | 1.9 | unsatisfied |
| E2 | 13 | 1.0 | 1021 | 0.17 | 2.0 | 2.0 | 2.9 | satisfied | 1.9 | unsatisfied |
| E3 | 13 | 1.0 | 1021 | 0.17 | 2.0 | 2.0 | 2.9 | satisfied | 1.9 | unsatisfied |
| F1 | 14 | 1.2 | 1038 | 0.05 | 2.5 | 2.1 | 1.3 | unsatisfied | 0.3 | unsatisfied |
| F2 | 14 | 1.2 | 1038 | 0.05 | 2.5 | 2.1 | 1.3 | unsatisfied | 0.3 | unsatisfied |
| F3 | 14 | 1.2 | 1038 | 0.05 | 2.5 | 2.1 | 1.3 | unsatisfied | 0.3 | unsatisfied |
| G1 | 15 | 1.6 | 1340 | 0.06 | 3.5 | 2.2 | 1.5 | unsatisfied | 0.5 | unsatisfied |
| G2 | 15 | 1.6 | 1340 | 0.06 | 3.5 | 2.2 | 1.5 | unsatisfied | 0.5 | unsatisfied |
| G3 | 15 | 1.6 | 1340 | 0.06 | 3.5 | 2.2 | 1.5 | unsatisfied | 0.5 | unsatisfied |
| H1 | 16 | 1.2 | 1306 | 0.21 | 5.0 | 4.2 | 3.2 | unsatisfied | 2.2 | unsatisfied |
| H2 | 16 | 1.2 | 1306 | 0.21 | 5.0 | 4.2 | 3.2 | unsatisfied | 2.2 | unsatisfied |
| H3 | 16 | 1.2 | 1306 | 0.21 | 5.0 | 4.2 | 3.2 | unsatisfied | 2.2 | unsatisfied |

| Member No. | Member Shape*** | Sheet Thickness to Width Ratio b/t | Crushing Stroke (mm) | Deformed State after Crushing | Crush Stability | Remarks |
|---|---|---|---|---|---|---|
| A1 | J | 33.3 | 160 | bellow shape | stable | Inventive Example |
| A2 | X | 33.3 | 200 | bellow shape | stable | Inventive Example |
| A3 | W | 33.3 | 240 | bellow shape | stable | Inventive Example |
| B1 | J | 40.0 | 160 | bellow shape | stable | Inventive Example |
| B2 | X | 40.0 | 200 | bellow shape | stable | Inventive Example |
| B3 | W | 40.0 | 240 | bellow shape | stable | Inventive Example |
| C1 | J | 33.3 | 160 | bellow shape | stable | Inventive Example |
| C2 | X | 33.3 | 200 | bellow shape | stable | Inventive Example |
| C3 | W | 33.3 | 240 | bellow shape | stable | Inventive Example |
| D1 | J | 33.3 | 160 | bellow shape | stable | Inventive Example |
| D2 | X | 33.3 | 200 | bellow shape | stable | Inventive Example |
| D3 | W | 33.3 | 240 | bellow shape | stable | Inventive Example |
| E1 | J | 40.0 | 160 | bellow shape | stable | Inventive Example |
| E2 | X | 40.0 | 200 | bellow shape | stable | Inventive Example |
| E3 | W | 40.0 | 240 | bellow shape | stable | Inventive Example |
| F1 | J | 33.3 | 160 | cracking | unstable | Comparative Example |
| F2 | X | 33.3 | 200 | cracking | unstable | Comparative Example |
| F3 | W | 33.3 | 240 | cracking | unstable | Comparative Example |
| G1 | J | 25.0 | 160 | cracking | unstable | Comparative Example |
| G2 | X | 25.0 | 200 | cracking | unstable | Comparative Example |
| G3 | W | 25.0 | 240 | cracking | unstable | Comparative Example |
| H1 | J | 33.3 | 160 | cracking | unstable | Comparative Example |
| H2 | X | 33.3 | 200 | cracking | unstable | Comparative Example |
| H3 | W | 33.3 | 240 | cracking | unstable | Comparative Example |

*Value obtained based on data for true strains of 5% and 10%. When the uniform elongation falls short of 10%, data obtained for a true strain of 5% and for a maximum true strain, and a true stress for each strain were used.
**Formula (1): $Rc/t \leq 1.31 \times \ln(n) + 5.21$ ... (1) Formula (2): $Rc/t \leq 1.31 \times \ln(n) + 4.21$ ... (2)
***See FIG. 2

All the Examples were stably buckled in the axial direction to be crush-deformed into a bellows shape.

In addition, the results obtained for Examples 1 and 2 are collectively shown in FIG. 5 in relation to the limit bending radius and the n-value. In FIG. 5, white circles each stand for a case where the member was stably buckled into a bellows shape, and black circles each stand for a case where the member suffered the generation of tearing and was not stably crushed into a bellows shape.

It can be understood from FIG. 5 that the member is stably buckled into a bellows shape and has an excellent collision energy absorbing performance in the axial direction upon collision when the value obtained by dividing the limit bending radius by the sheet thickness (the limit bending radius/the sheet thickness) satisfies Formulae (1) and (2). For example, when the material steel sheet has a large n-value, the member stably crushes into a bellows shape. Meanwhile, even if the n-value is rather small, for example, to be 0.20 or less, the member is still allowed to be stably crushed as long as the value obtained by dividing the limit bending radius by the sheet thickness (the limit bending radius/the sheet thickness) satisfies Formulae (1) and (2). Meanwhile, a member formed of a steel sheet that does not satisfy Formula (1) suffers the generation of tearing regardless of the shape thereof, and unable to attain stable collapse deformation.

The invention claimed is:

1. A vehicle collision energy absorbing member formed by shaping a high strength thin steel sheet,
   wherein the high strength thin steel sheet has a tensile strength TS of at least 980 MPa, and has an n-value and a limit bending radius Rc satisfying Formula (1) below:

$$Rc/t \leq 1.31 \times \ln(n) + 5.21 \quad (1);$$

where
   Rc: limit bending radius (mm),
   t: sheet thickness (mm), and
   n: n-value obtained for a true strain is 5% to 10%,
   the high strength thin steel sheet includes a chemical composition containing, by mass %:
   C: 0.14% to 0.30%;
   Si: 0.01% to 1.6%;
   Mn: 3.5% to 10%;
   P: 0.060% or less;
   S: 0.0050% or less;
   Al: 0.01% to 1.5%;
   N: 0.0060% or less;
   Nb: 0.01% to 0.10%; and
   the balance being Fe and incidental impurities, and
   the high strength thin steel sheet has a microstructure including a ferrite phase by 30% to 70% in volume fraction with respect to the entire microstructure and a secondary phase other than the ferrite phase, the ferrite phase having an average grain size of 1.0 μm or smaller, the secondary phase at least containing a retained austenite phase by at least 10% in volume fraction to the entire microstructure, the retained austenite phase having an average spacing of 1.5 μm or less.

2. A vehicle collision energy absorbing member formed by shaping a high strength thin steel sheet,
   wherein the high strength thin steel sheet has a tensile strength TS of at least 980 MPa, and has an n-value and a limit bending radius Rc satisfying Formula (2) below:

$$Rc/t \leq 1.31 \times \ln(n) + 4.21 \quad (2);$$

where
   Rc: limit bending radius (mm),
   t: sheet thickness (mm), and
   n: n-value obtained for a true strain is 5% to 10%,
   the high strength thin steel sheet includes a chemical composition containing, by mass %:
   C: 0.14% to 0.30%;
   Si: 0.01% to 1.6%;
   Mn: 3.5% to 10%;
   P: 0.060% or less;
   S: 0.0050% or less;
   Al: 0.01% to 1.5%;
   N: 0.0060% or less;
   Nb: 0.01% to 0.10%; and
   the balance being Fe and incidental impurities, and
   the high strength thin steel sheet has a microstructure including a ferrite phase by 30% to 70% in volume fraction with respect to the entire microstructure and a secondary phase other than the ferrite phase, the ferrite phase having an average grain size of 1.0 μm or smaller, the secondary phase at least containing a retained austenite phase by at least 10% in volume fraction to the entire microstructure, the retained austenite phase having an average spacing of 1.5 μm or less.

3. The vehicle collision energy absorbing member according to claim 1, wherein the chemical composition contains Si and Al such that total content of Si and Al (Si+Al) by mass % is at least 0.5%.

4. The vehicle collision energy absorbing member according to claim 2, wherein the chemical composition contains Si and Al such that total content of Si and Al (Si+Al) by mass % is at least 0.5%.

5. A method of manufacturing a vehicle collision energy absorbing member comprising:
   hot-rolling a steel slab to obtain a hot-rolled steel sheet;
   cooling the hot-rolled steel sheet at an average cooling rate of 5° C./s to 200° C./s in a temperature range to 750° C.;
   cold-rolling the cooled steel sheet at a reduction rate of 30% to 60% to obtain a cold-rolled steel sheet;
   annealing the cold-rolled steel sheet at an annealing temperature to obtain a high strength thin steel sheet; and
   forming the high strength thin steel sheet into a predetermined shape to obtain the vehicle collision energy absorbing member,
   wherein
   the annealing temperature is 650° C. to 750° C.,
   an average heating rate from 300° C. to 600° C. is 1° C./s to 50° C./s, and
   an average heating rate from 600° C. to the annealing temperature is 0.1° C./s to 10° C./s in the annealing,
   the high strength thin steel sheet has a tensile strength TS of at least 980 MPa and an n-value and a limit bending radius Rc satisfying Formula (1) below;

$$Rc/t \leq 1.31 \times \ln(n) + 5.21 \quad (1);$$

where
   Rc: limit bending radius (mm),
   t: sheet thickness (mm), and
   n: n-value obtained for a true strain is 5% to 10%,
   the high strength thin steel sheet includes a chemical composition containing, by mass %:
   C: 0.14% to 0.30%;
   Si: 0.01% to 1.6%;
   Mn: 3.5% to 10%;
   P: 0.060% or less;
   S: 0.0050% or less;

Al: 0.01% to 1.5%;
N: 0.0060% or less;
Nb: 0.01% to 0.10%; and
the balance being Fe and incidental impurities, and the high strength thin steel sheet has a microstructure including a ferrite phase by 30% to 70% in volume fraction with respect to the entire microstructure and a secondary phase other than the ferrite phase, the ferrite phase having an average grain size of 1.0 μm or smaller, the secondary phase at least containing a retained austenite phase by at least 10% in volume fraction to the entire microstructure, the retained austenite phase having an average spacing of 1.5 μm or less.

6. A method of manufacturing a vehicle collision energy absorbing member comprising:
   hot-rolling a steel slab to obtain a hot-rolled steel sheet;
   cooling the hot-rolled steel sheet at an average cooling rate of 5° C./s to 200° C./s in a temperature range to 750° C.;
   cold-rolling the cooled steel sheet at a reduction rate of 30% to 60% to obtain a cold-rolled steel sheet;
   annealing the cold-rolled steel sheet at an annealing temperature to obtain a high strength thin steel sheet; and
   forming the high strength thin steel sheet into a predetermined shape to obtain the vehicle collision energy absorbing member;
   wherein
   the annealing temperature is 650° C. to 750° C.,
   an average heating rate from 300° C. to 600° C. is 1° C./s to 50° C./s, and
   an average heating rate from 600° C. to the annealing temperature is 0.1° C./s to 10° C./s in the annealing,
   the high strength thin steel sheet has a tensile strength TS of at least 980 MPa and an n-value and a limit bending radius Rc satisfying Formula (2) below;

$$Rc/t \leq 1.31 \times \ln(n) + 4.21 \qquad (2);$$

where
Rc: limit bending radius (mm),
t: sheet thickness (mm), and
n: n-value obtained for a true strain is 5% to 10%,
the high strength thin steel sheet includes a chemical composition containing, by mass %:
   C: 0.14% to 0.30%;
   Si: 0.01% to 1.6%;
   Mn: 3.5% to 10%;
   P: 0.060% or less;
   S: 0.0050% or less;
   Al: 0.01% to 1.5%;
   N: 0.0060% or less;
   Nb: 0.01% to 0.10%; and
   the balance being Fe and incidental impurities, and
the high strength thin steel sheet has a microstructure including a ferrite phase by 30% to 70% in volume fraction with respect to the entire microstructure and a secondary phase other than the ferrite phase, the ferrite phase having an average grain size of 1.0 μm or smaller, the secondary phase at least containing a retained austenite phase by at least 10% in volume fraction to the entire microstructure, the retained austenite phase having an average spacing of 1.5 μm or less.

7. The method according to claim 5, wherein the chemical composition contains Si and Al such that total content of Si and Al (Si+Al) by mass % is at least 0.5%.

8. The method according to claim 6, wherein the chemical composition contains Si and Al such that total content of Si and Al (Si+Al) by mass % is at least 0.5%.

* * * * *